United States Patent [19]

Kapura et al.

[11] 4,342,583
[45] Aug. 3, 1982

[54] APPARATUS AND METHOD FOR ATTENUATING FLOATING GLASS RIBBON

[75] Inventors: Edward M. Kapura, Carlisle, Pa.; Henry C. Goode, Decatur, Ill.

[73] Assignee: PPG Industries, Inc., Pittsburgh, Pa.

[21] Appl. No.: 219,147

[22] Filed: Dec. 22, 1980

[51] Int. Cl.³ .................................. C03B 18/06
[52] U.S. Cl. ............................ 65/99.5; 65/182.4; 65/182.5
[58] Field of Search ............... 65/99 A, 29, 182.4, 65/182.5, 164, 333, 158, 99.5

[56] References Cited

U.S. PATENT DOCUMENTS

| | | | |
|---|---|---|---|
| 3,450,518 | 6/1969 | Itakura et al. | 65/182.4 |
| 3,520,672 | 7/1970 | Greenler et al. | 65/91 |
| 3,661,548 | 5/1972 | Ito et al. | 65/182 R |
| 3,684,471 | 8/1972 | Matsushita | 65/182.4 X |
| 3,695,859 | 10/1972 | Dickinson et al. | 65/99 A |
| 3,709,673 | 1/1973 | Bishop | 65/182 R |
| 3,713,797 | 10/1970 | Lawrenson | 65/91 |
| 3,929,444 | 12/1975 | May et al. | 65/182 R |
| 3,998,616 | 12/1976 | Farabaugh | 65/29 |
| 4,157,908 | 6/1979 | Gagne | 65/99 A |

OTHER PUBLICATIONS

*Journal of the American Ceramic Society*, vol. 60, No. 1-2, Jan.-Feb., 1977, "A One-Dimensional Model of Stretching Float Glass," O. S. Narayanaswamy.

*Primary Examiner*—Arthur D. Kellogg
*Attorney, Agent, or Firm*—Dennis G. Millman; Donald Carl Lepiane

[57] ABSTRACT

A method of and apparatus for attenuating a ribbon of float glass in a temperature region below 1500° F. (815° C.) to diminish undesirable longitudinally oriented optical distortions. A cylindrical ribbon engaging device is rotated about an axis of rotation substantially parallel to the ribbon surface and the direction of ribbon flow to positively exert a plurality of outwardly directed lateral forces to an elongated substantial continuum of the marginal edge portion of the ribbon. Ribbon engaging elements are disposed about the circumferential surface of the cylindrical device in elongated helical paths, and the cylindrical device is rotated at an angular velocity such that the product of the angular velocity and the pitch of the helical paths equals the longitudinal velocity of the ribbon flow while the device acts upon the ribbon surface.

23 Claims, 7 Drawing Figures

APPARATUS AND METHOD FOR ATTENUATING FLOATING GLASS RIBBON

FIELD OF THE INVENTION

The present invention relates to an apparatus for and method of engaging the marginal edge portions of a ribbon of float glass, and further, to a drum-shaped edge roll for exerting forces on marginal edge portions of the ribbon.

DISCUSSION OF THE TECHNICAL PROBLEM

In a float forming process, molten glass is delivered onto a pool of molten metal and thereafter formed into a continuous ribbon. Under the competing forces of gravity and surface tension, the molten glass spreads to an equilibrium thickness of about 0.27 inches (0.69 cm). In order to produce glass ribbon of less than equilibrium thickness the ribbon is normally subjected to both longitudinal and lateral tractive forces while in a viscous state.

Longitudinal tractive forces are generally exerted upon the ribbon at the discharge end by lift out rolls which withdraw the ribbon from the float chamber. Such longitudinal forces may adversely affect the ribbon in at least two ways; by prompting a narrowing tendency, and by inducing optically undesirable surface variations in the ribbon. Such surface variations may take the form of longitudinally oriented distortions, e.g. corrugations.

It is known in the glass manufacturing art to exert outwardly directed lateral tractive forces to the marginal edge portions of the viscous ribbon to control the narrowing tendency of the ribbon and produce lateral ribbon attenuation. Examples of such techniques may be found in the teachings of U.S. Pat. Nos. 3,450,518 to Itakura et al; 3,520,672 to Greenler; 3,695,859 to Dickinson; 3,709,673 to Bishop; 3,929,444 to May et al; 3,998,616 to Farabaugh and 4,157,908 to Gagne. Teachings of each of the above-mentioned patents are useful in the temperature and viscosity region where the ribbon is readily attenuatable, i.e., where ribbon temperature is between about 1800° F. (980° C.) and about 1500° F. (815° C.). It has been learned, however, that undesirable longitudinally oriented ribbon distortions may originate in a lower temperature region downstream of the typical attenuation region, e.g., between about 1500° F. and about 1250° F. None of the subject patents recognize the existence of such a problem, nor do they teach a method of diminishing the adverse effects of such distortions. Further, the devices utilized in the subject patents are not ideally suited for operation in the lower temperature range where such distortions may originate.

For example, U.S. Pat. Nos. 3,709,673 to Bishop; 3,929,444 to May et al; and 3,998,616 to Farabaugh are exemplary of edge roll machines known in the glass manufacturing art which engage the marginal edge portion of the ribbon with a rotating disc-shaped edge roll having circumferentially positioned teeth. The edge roll is generally mounted on one end of a barrel which extends through the chamber side wall, and is driven from outside the chamber about an axis of rotation parallel to the barrel. The barrel is inserted into the chamber at an angle generally slightly downstream of a line normal to the ribbon's center line to provide the desired lateral component of force. Although these devices are useful in attenuating the ribbon in the traditional attenuation region, the devices are normally spaced about 10 feet (3 m) apart on each side of the ribbon and each exerts a force upon the ribbon along only a very small portion of the marginal edge, effectively a point of applied force. As a result, they are relatively ineffective in supplying the increased lateral attenuation forces required in the lower temperature region where ribbon viscosity has increased. Further, the teeth of the subject devices have diminished ability to grip the lower temperature, higher viscosity ribbon, thus resulting in skidding rather than effective gripping, and further limiting effectiveness.

U.S. Pat. No. 3,520,672 to Greenler teaches an edge roll machine having a plurality of closely spaced disc-shaped edge rolls, each mounted on individual barrels and commonly driven from without the chamber to rotate about an axis of rotation slightly downstream of a line normal to the ribbon's center line. Although this device provides more closely spaced forces to the marginal edge of the ribbon, there still remains at least the diameter of a single edge roll between adjacent points of force, and furthermore, the plurality of individual barrels may act as a considerable heat sink along the ribbon edge to create an undesirable temperature gradient thereacross.

U.S. Pat. No. 3,450,518 to Itakura et al. teaches an edge grasping device including an elongated rod having a ribbon engaging hook secured to one end. The rod is extended through the chamber side wall and reciprocated in a generally elliptical manner to cause the hook to intermittently grasp the ribbon edge and pull it laterally outward. Such a device exerts a force on very small region of the ribbon and suffers from the previously discussed limitations related thereto. Further, the hook only engages the ribbon during about one half of its reciprocating path, leaving the ribbon disengaged during the remaining portion.

U.S. Pat. No. 4,157,908 to Gagne teaches an edge engaging device having a toothed cylindrical member supported at one end thereof by a single elongated arm. The cylindrical member is engaged to the ribbon and rotated about an axis which extends generally in the direction of glass flow. This patent teaches that the cylindrical member be positioned such that its downstream end is imbedded into the surface of the glass while its upstream end remains above and disengaged from the surface of the glass to avoid a backup of the glass. Although useful in controlling ribbon thickness in the temperature region where the ribbon is readily attenuatable, the device is limited in its usefulness in the subject lower temperature region. The angled engagement between the cylindrical member and the ribbon surface limits the effective length of the cylindrical member, but more importantly, may be largely unattainable in the lower temperature ranges because of the relatively higher viscosity of the ribbon and corresponding increased resistance to indentations by objects having large surface areas.

An article in *The Journal Of The American Ceramics Society*, Vol. 6, No. 1-2, January-February 1977, pp. 1-5 by O. S. Narayanaswamy teaches a method of attenuating a float glass ribbon which includes advancing molten glass to a bath entry region where it freely flows to equilibrium thickness; then advancing it downstream to a cooled, high viscosity (1300° F., $10^8$P) region of equilibrium thickness; followed by advancement through a region where the glass is reheated and attenuated to less than equilibrium thickness. The intermediate high viscosity region includes a pair of opposed conventional edge rolls which grip the ribbon to counteract the downstream longitudinal tractive force and prevent its transmission into the bath entry region. The article does not address the problem of diminishing longitudinal distortion in the ribbon after attenuation occurs. It would be advantageous to have a method of attenuating float glass which would diminish longitudinal distortion in the final product. It would also be advantageous to have a device capable of effecting such a result which is operable in a relatively low temperature, high viscosity region of the float chamber.

SUMMARY OF THE INVENTION

It has been learned that a glass ribbon having diminished longitudinal surface distortions may be produced by applying laterally outward tractive forces to a previously attenuated ribbon which is at a temperature less than about 1500° F. (815° C.). In particular, a stream of molten glass is delivered onto a pool of molten metal contained in a forming chamber and attenuated in a first region of the molten metal pool to form a ribbon of a first thickness by the application of at least longitudinal tractive forces. The present invention includes advancing the ribbon in a longitudinal direction from the first region to a second region of the pool and positively applying laterally outward tractive forces along an elongated substantial continuum of the marginal edge of the ribbon in the second region at temperatures less than about 1500° F. (815° C.) to diminish longitudinally oriented distortion patterns in the ribbon. The ribbon may be cooled in the second region from about 1500° F. (815° C.) to about 1100° F. (595° C.) and withdrawn from the pool at the downstream end thereof. Preferably the outwardly directed lateral forces are positively exerted when the ribbon is at a temperature between about 1500° F. (815° C.) and about 1250° F. (678° C.), and are applied along the marginal edge of the ribbon without impeding the longitudinal flow of the ribbon.

The invention further relates to a method of attenuating a ribbon of glass, including the steps of providing a cylindrical member having a ribbon engaging element, e.g., teeth or ridge, about its circumferential surface, supporting the cylindrical member with its lower circumferential surface adjacent and substantially parallel to the ribbon surface, and rotating the cylindrical member about an axis of rotation which is generally parallel to the direction of ribbon flow. Such rotation enables the ribbon engaging element to engage the ribbon to positively exert laterally outward tractive forces thereto. Preferably the ribbon engaging element is mounted about the surface along longitudinally elongated helical paths, and the cylindrical member is rotated with an angular velocity such that the product of the pitch of the helical path and the angular velocity equals the downstream velocity of the ribbon in the area of engagement. In this manner the laterally outward tractive forces may be applied along elongated portions of the marginal edge of the ribbon without impeding the longitudinal flow thereof.

The invention further relates to an apparatus for practicing the above-described method of attenuating a glass ribbon. A cylindrical member having a ribbon engaging element about its circumferential surface is rotatably supported at both ends by a pair of spaced support members, with its lower circumferential surface adjacent and substantially parallel to the surface of the ribbon. Facilities are provided for rotating the cylindrical member, and preferably fluid cooling is provided through the support members into the cylindrical member, along with facilities for localizing the cooling fluid flow adjacent the inner surface of the cylindrical member. In another preferred embodiment, facilities are provided which establish a gaseous curtain adjacent the interfaces of the cylindrical member and support members to prevent communication between the cooling fluid and the hostile gaseous atmosphere of the forming chamber.

The present invention provides a method and apparatus for attenuating a ribbon of glass to diminish undesirable longitudinally oriented surface distortions which are produced in the ribbon both in the traditional attenuation region and downstream therefrom, by the positive application of outwardly directed lateral forces in the region where the ribbon has a temperature less than about 1500° F. (815° C.).

DETAILED DESCRIPTION OF THE INVENTION

Figure 1:
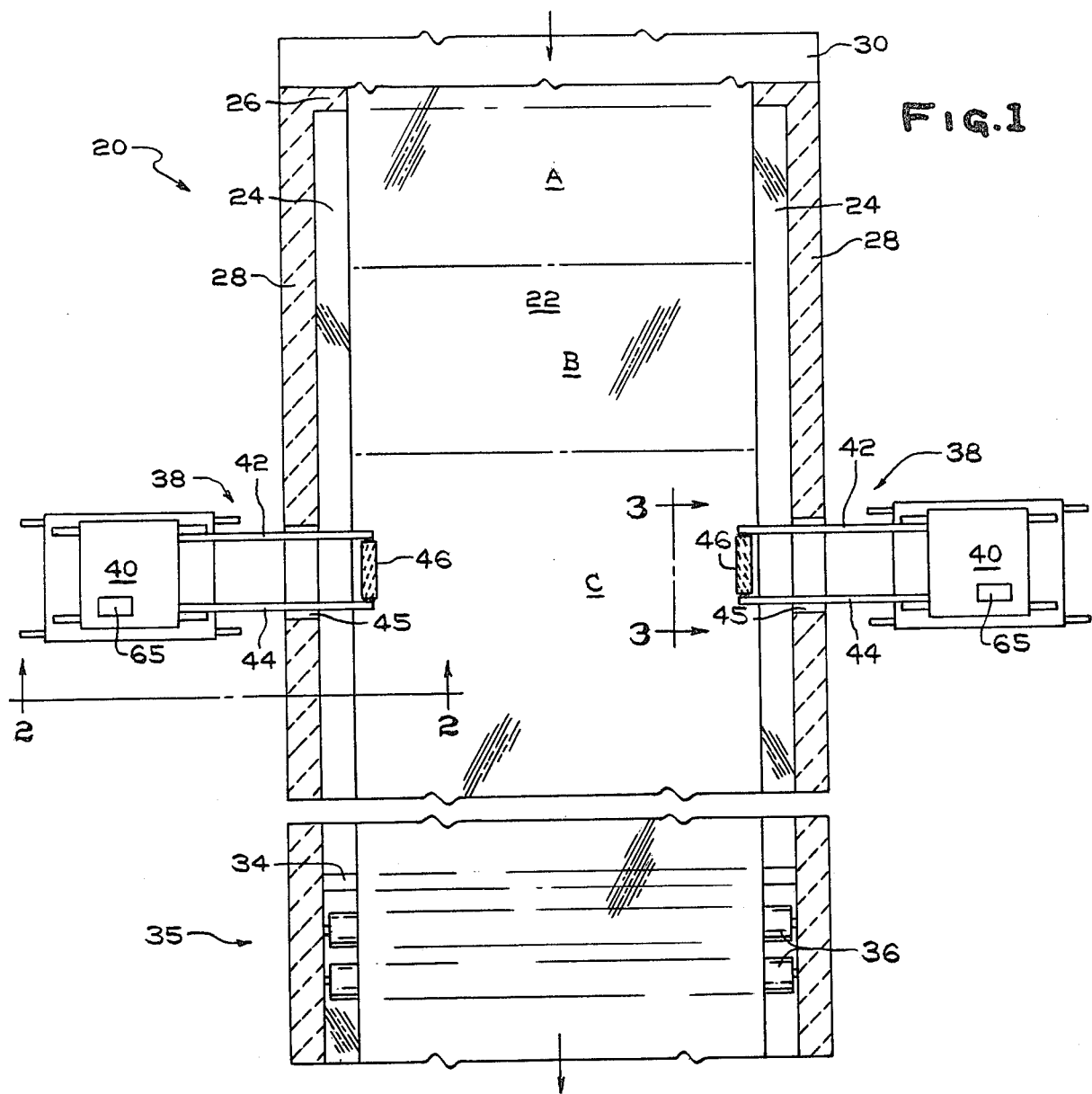
FIG. 1 is a fragmented schematic plan view of a float chamber having portions of the roof removed to show edge engaging devices operating according to a preferred embodiment of the present invention.

Referring to FIG. 1, there is shown a float glass forming chamber 20 of the type known in the glass manufacturing art. The chamber 20 generally consists of a refractory backwall 26, refractory sidewalls 28, a refractory roof 30, a refractory bottom 32 (shown only in FIG. 2), and a refractory end dam 34 adjacent a discharge end 35. In general, a ribbon 22 of glass is formed in chamber 20 from a mass of molten glass which is delivered upon a pool 24 of molten metal, e.g. tin or an alloy thereof. The ribbon is advanced downstream upon the pool 24 in the direction of the arrow by a plurality of lift out rolls 36 located near the discharge end 35 of the chamber 20. As the ribbon advances downstream it generally cools from an initial temperature of about 2000° F. (1100° C.) to about 1100° F. (595° C.) at the discharge end 35.

Although not limiting to the invention, it is generally desirable to deliver a mass of molten glass onto the pool 24 in any convenient manner at a relatively high initial temperature, i.e. 2000° F. (1100° C.), and maintain the glass in a relatively high temperature range, e.g. from about 2000° F. (1100° C.) to about 1700° F. (925° C.), for a relatively long residence time. Such a region is designated region A in FIG. 1 and represents a relaxation zone where the relatively low viscosity of the glass encourages equilibration of flow perturbations arising from the delivery onto the pool 24. Accordingly, in region A the glass is generally either greater than or equal to equilibrium thickness.

Region B of FIG. 1 represents an attenuation region of the chamber 20 in which the ribbon 22 is stretched to a thickness less than equilibrium thickness in any convenient manner. Although not limiting to the invention, the glass may enter region B at a temperature of about 1800° F. (980° C.) and is typically cooled while passing therethrough to a temperature of about 1500° F. (815° C.) at the downstream end. The glass is drawn from region A into region B and therethrough by longitudinal forces which are exerted upon the glass by the lift out rolls 36 adjacent the discharge end 35 of the chamber 20. Such longitudinal forces produce a desirable reduction in thickness in the ribbon in region B, but also tend to produce an undesirable reduction in ribbon width due to surface tension forces in the ribbon. For this reason, although not limiting to the invention, it is common in the glass manufacturing art to also exert lateral stretching forces to the ribbon in region B. Top edge rolls as taught in U.S. Pat. No. 3,929,444, gas jets as taught in U.S. Pat. No. 3,440,030, while teachings are incorporated herein by reference, and other means have been utilized in region B to exert such lateral stretching forces. The lateral stretching forces may be controlled in region B so as to increase ribbon width, maintain a constant ribbon width, or produce a controlled reduction in ribbon width, as taught in U.S. Pat. Nos. 3,440,030, 3,843,346, and 3,695,859, respectively, while teachings ae also incorporated herein by reference.

Region C of FIG. 1 represents a region of the chamber 20 wherein the ribbon has a temperature between about 1500° F. (815°C.) and the discharge temperature of about 1100° F. (595° C.). Because of the ribbon's relatively high viscosity in this region it has heretofore generally been considered impractical and ineffective to exert lateral stretching forces upon the ribbon in region C. Accordingly, it has been customary to effect a major portion of the ribbon attenuation in region B by the application of both lateral and longitudinal stretching forces, afterwhich the ribbon 22 was advanced through region C and cooled without the application of lateral stretching forces. Some portion of the total attenuation may occur in region C, but it has heretofore been accompanied by a corresponding decrease in ribbon width due to ribbon surface tension forces. To minimize this corresponding decrease of ribbon width, it is common to rapidly cool the ribbon upon entry into region C.

It has been determined, however, that undesirable longitudinally oriented surface distortion patterns may originate in the ribbon 22 in region C. It is believed that such distortion patterns may be a result of the longitudinal tractive forces exerted upon the ribbon 22 by the lift out rolls 36 and the above mentioned decrease in ribbon width produced thereby. Additional distortion is believed to be caused by the rapid cooling needed in region C to avoid undue ribbon width decrease.

Such surface distortion patterns may take the form of corrugations in the ribbon, which will diminish the optical quality of the final ribbon according to the relationship:

$$P = khf^2$$

where P is the optical power of the distortion in diopters, k is a constant, h is the amplitude of the surface defect in meters, and f is the spatial frequency of the distortion pattern in inverse meters.

According to the present invention, outwardly directed lateral forces are positively exerted to the ribbon in region C to diminish or eliminate the effect of such longitudinally oriented distortion patterns. More particularly, the lateral forces are applied to reduce the amplitude, h, and spatial frequency, f, of the pattern, with a particular interest in reducing the spatial frequency f because of its second power relationship with the optical power, P. Moreover, application of such lateral forces in region C permits the cooling of the ribbon to be effected in a more gradual and natural manner, thus avoiding distortion problems which were previously encountered due to rapid cooling.

Because of the relatively high viscosity of the ribbon 22 in region C, it is desirable to exert relatively large lateral stretching forces to the ribbon to produce the desired result. Further, because the surface of the ribbon 22 becomes increasingly more difficult to grip with teeth or the like as the ribbon viscosity increases, it is desirable to exert a plurality or continuous line of lateral stretching forces to an elongated substantial continuum of the marginal edge of the ribbon, in order to achieve the necessary relatively large lateral stretching force. Of course, such a plurality of forces must be exerted in such a manner that the longitudinal movement of the ribbon is not substantially impeded Referring to FIG. 1, edge engaging devices 38, incorporating features of the present invention, are utilized in region C to positively exert relatively large lateral stretching forces, in order to control ribbon width therein and diminish distortion effects. More particularly, edge engaging devices 38 may be utilized to increase ribbon width, maintain ribbon width at a constant value, or establish a controlled decrease in ribbon width. Each of the devices 38 includes a support facility 40 positioned outside the sidewall 28, a pair of spaced, elongated arms 42 and 44 which extend through a sealable opening 45 in sidewall 28, and a glass engaging member 46. The glass engaging member 46 is preferably generally cylindrically or drum shaped and is rotatably mounted along its longitudinal centerline between the extended ends of arms 42 and 44 in a manner to be discussed below. As shown in FIG. 1, the member 46 is positioned such that its longitudinal centerline is generally parallel to the longitudinal centerline of the ribbon 22, and as shown in FIG. 3, such that its lower circumferential surface is generally parallel to the surface of the ribbon 22.

Figure 3:
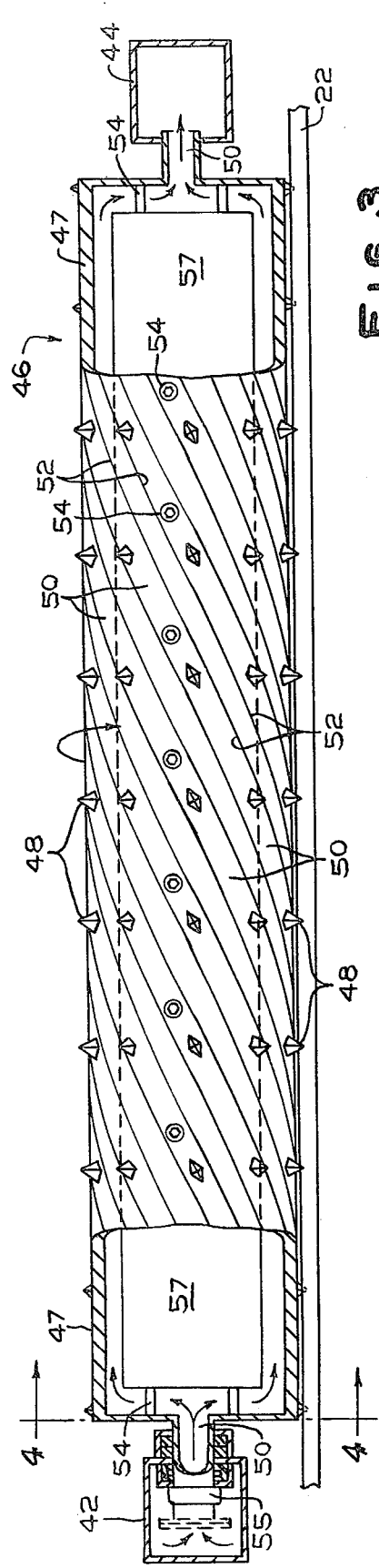
FIG. 3 is a view having portions removed for clarity taken along line 3—3 of FIG. 1 showing an edge engaging device incorporating features of the present invention.
Figure 4:
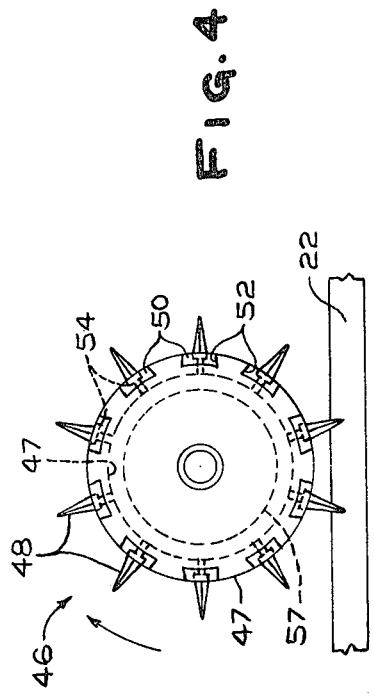
FIG. 4 is a view taken along line 4—4 of FIG. 3 showing the orientation of teeth about the outer circumferential surface of the edge engaging device.
Figure 7:
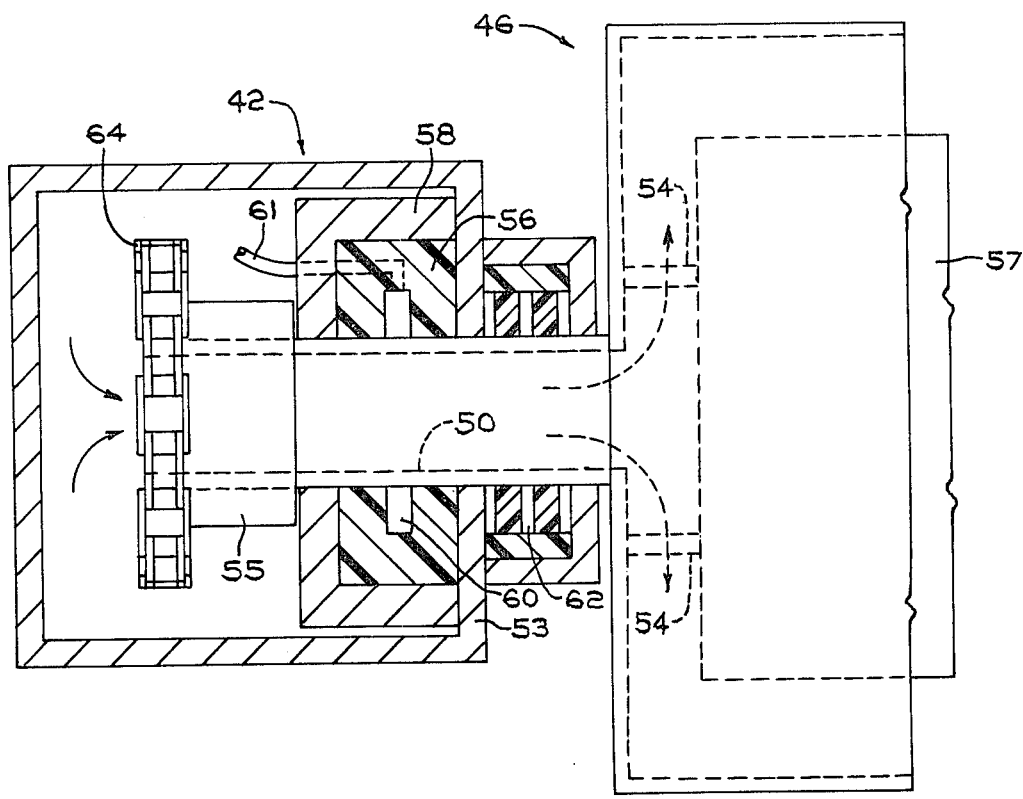
FIG. 7 is an enlarged view of the left hand portion of FIG. 3.

Referring to FIGS. 3 and 4, the glass engaging member 46 includes an outer cylindrical member 47 having a plurality of discrete teeth 48 secured to the outer circumferential surface thereof. The teeth 48 are mounted in spaced relation along a strap 50 which has beveled edges, which edges are captured in a complementarily beveled groove 52 in the surface of the member 47, and retained therein by set screws 54. In this manner, discrete teeth 48, or rows thereof, may be conveniently replaced without requiring replacement or re-machining of the glass engaging member 46. Replacability of teeth permits optimizing of the effectiveness of the glass engaging member 46 when it is utilized in different regions of the chamber 20, as different teeth configurations may be more efficient in different regions.

Figure 5:
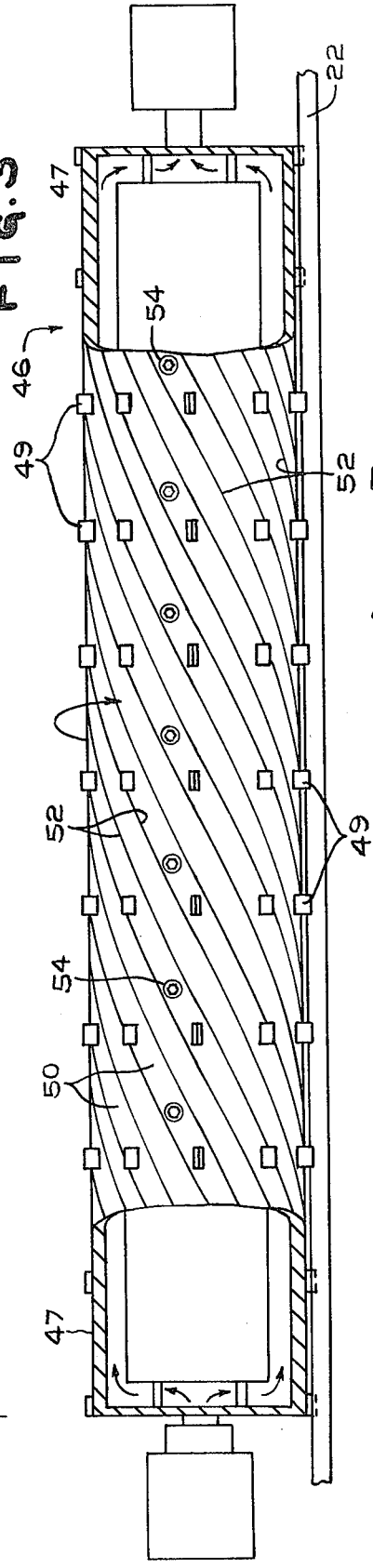
FIG. 5 is a view similar to the view of FIG. 3 showing a second embodiment of the present invention.

For example, it is preferred that the teeth 48 which are used in region C be relatively long and sharp, and may take the form of cones or pyramids as shown in FIGS. 3 and 4. Alternatively, and with reference to FIG. 5, teeth 49 may have a rectangular base having a lengthwise dimension parallel to the centerline of the cylindrical member 47. Preferably, such teeth have a relatively sharp apex also lying parallel to the centerline of the cylindrical member 47. Because ribbon movement is generally parallel to the centerline of the cylindrical member 47, such an arrangement of the teeth 49 minimizes any impedance to the ribbon flow, while also presenting a relatively large surface area for gripping the ribbon in the lateral direction.

Figure 6:
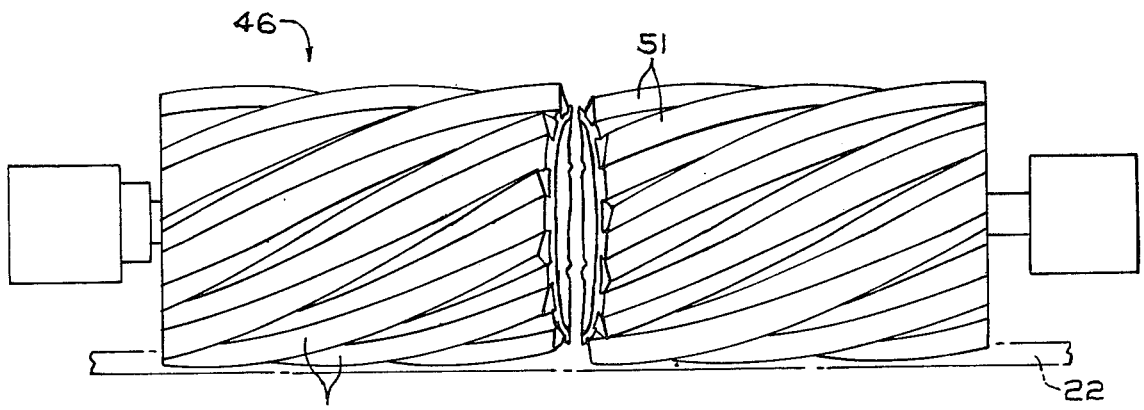
FIG. 6 is a view similar to the view of FIG. 3 showing a third embodiment of the present invention.

Referring to FIG. 6, a strap 51 having a continuous ridge formed on its outer surface may be optionally utilized on cylindrical member 47 instead of discrete teeth 48 or 49. Preferably the glass engaging ridge of strap 51 has a relatively sharp apex angle to promote efficient ribbon gripping when such an arrangement is used in region C of the chamber 20.

Of course, the edge engaging devices 38 of the present invention may also be utilized in region B for traditional attenutation activities, in which case, conventionally shaped teeth may also be utilized.

As shown in FIGS. 3, 4, 5 and 6 the straps 50 or 51 and grooves 52 are preferably disposed on the outer surface of the outer cylindrical member 47 in longitudinally elongated helical paths. It is preferred in the operation of the instant invention that the longitudinal movement of the ribbon remain substantially unimpeded by the action of the ribbon engaging element, i.e., teeth or ridge, upon the ribbon. Accordingly, the helical pathed strap arrangement is aligned such that when the glass engaging member 46 is rotated to impart a laterally outward velocity to the ribbon engaging element, the helical path appears to move in the downstream direction. Stated in a different manner, the most upstream portion of any particular helically pathed strap engages the ribbon first, followed in sequence by the next adjacent downstream portion along the same helical path. If viewed in the downstream direction, a glass engaging member 46 positioned on the right side of the ribbon is rotated in a counterclockwise direction to exert laterally outward forces to the ribbon. When viewed while stationary, helically positioned straps 50 or 51 on the right side member 46 spiral thereabout in the clockwise direction. Likewise, a glass engaging member 46 on the left side of the ribbon rotates in a clockwise direction, and helically positioned straps 50 or 51 spiral thereabout in the counterclockwise direction.

In a preferred mode of operation of the above described apparatus, the glass engaging member 46 is rotated with an angular velocity such that the product of said angular velocity and the pitch of the helical paths disposed thereon is substantially equal to the linear downstream velocity of the ribbon immediately adjacent the glass engaging member 46. In other words, $$w \cdot p = v,$$

where w represents the angular velocity of the glass engaging member 46, p represents the pitch of the helical path of strap 50 or 51, and v represents the downstream ribbon velocity at the area of engagement with the glass engaging member 46. By operating in this manner, an elongated substantial continuum of the ribbon 22 is maintained in semi-continuous engagement with the teeth 48 or 49 of a particular helical path from the upstream end of the glass engaging member 46 to the downstream end thereof. Likewise, a portion of the ribbon 22 is maintained in continuous engagement with a ridged strap 51 along the length of the member 46.

Further, adjacent helically pathed straps 50 or 51 are preferably spaced from one another around the circumference of the member 46 a distance approximately equal to the length of the engagement path of any particular portion of the ribbon engaging element. Engagement path as used herein refers to that portion of any tooth's circular motion during which it is engaged to the ribbon. In this manner, when the ribbon engaging element at a particular longitudinal position along the member 46 disengages from the ribbon at the release point of its engagement path, a corresponding ribbon engaging element of the next adjacent helical path occupies the initial engaging point previously occupied by the releasing element.

By so arranging the orientation of the ribbon engaging elements and coordinating the angular velocity of member 46 to the linear velocity of the ribbon 22, the ribbon 22 may be engaged along an elongated, generally rectangular-shaped portion of the marginal edge in a continuous or semicontinuous fashion without substantially impeding the longitudinal ribbon flow. Such a plurality of closely positioned forces is sufficient in the aggregate to achieve the desired ribbon width control in the relatively high viscosity ribbon of region C. In addition, such an elongated engagement capacity avoids imposing areas of nonuniform stress in the ribbon, a condition commonly produced by spaced-apart point sources of lateral force. Accordingly, use of the edge engaging devices 38 according to the present invention may be beneficial in all regions of the chamber 20 where lateral forces are desired to be exerted upon the ribbon.

Figure 2:
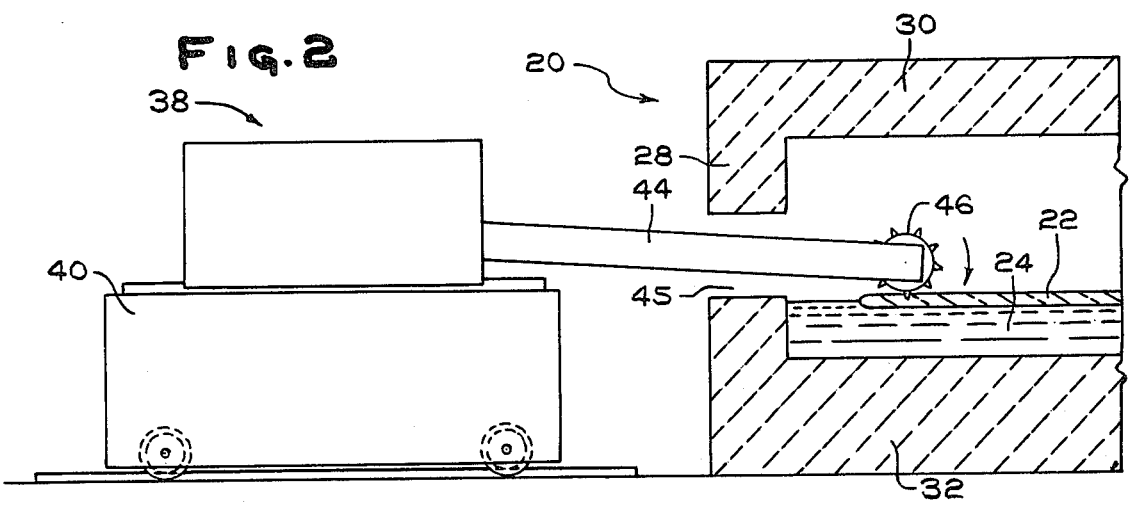
FIG. 2 is an elevated side view of an edge engaging device incorporating features of the present invention taken along line 2—2 of FIG. 1.

Referring to FIGS. 1 and 2, the support facility 40 of edge engaging device 38 should provide for vertical adjustment of the engaging member 46, upstream or downstream angular adjustment of engaging member 46, and inward and outward adjustment of the position of engaging member 46 with respect to the ribbon 22. Facilities known in the glass manufacturing art, such as floor mounted carriages as shown in FIG. 2 and as taught in U.S. Pat. No. 3,709,673, which teachings are herein incorporated by reference, may be conveniently modified to support the pair of elongated arms 42 and 44. Alternatively, an overhead-mounted support facility such as taught in U.S. Pat. No. 3,929,444, which teachings are incorporated by reference, may be conveniently utilized.

Referring now to FIGS. 3 and 6, an end of the engaging member 46 is rotatably mounted to an end of adjacent elongated arm 42 or 44 by a hollow shaft member 50, which is sealingly secured to the end of the engaging member 46 at one end and extends into the interior of elongated arm 42 or 44 through an opening in the inside vertical wall portion 53 thereof. The hollow shaft member 50 is rotatably mounted within the elongated arm 42 or 44 by bearings 55.

Because of the high temperatures encountered within the forming chamber 20, it is desirable to cool the engaging member 46. Accordingly, cooling fluid is passed through elongated arm 42 and hollow shaft 50 to the engaging member 46 and therethrough to elongated arm 44, as illustrated by fluid flow arrows of FIGS. 3 and 6. A solid inner cylindrical member 57 is conveniently mounted inside the engaging member 46 by baffle plates 54, to divert and localize the flow of cooling fluid to the areas adjacent the surface portions of the other cylindrical member 47 (as shown by fluid flow arrows). In this manner the weight of the engaging member 46 is minimized and cooling capacity is utilized more effectively.

Referring to FIG. 6, it is important to assure that cooling fluid remains within a closed system and does not escape into the atmosphere of the forming chamber 20. Likewise, it is important to protect the interior components of the edge engaging device 38 from attack by the hostile gaseous atmosphere of the forming chamber 20. Accordingly, a sealing system is utilized in the present invention, including a sealing ring 56 which is retained in position adjacent the rotatable hollow shaft 50 by a retainer ring 58. The sealing ring 56 forms a hollowed-out groove 60 which surrounds a closed path portion of the hollow shaft 50. In order to prevent egress of cooling fluid and ingress of hostile chamber atmosphere along the outer surface of the rotatable shaft 50, the groove 60 is purged with a pressurized fluid flow. Preferably, a gaseous sealing medium is supplied to the groove 60 through inlet tubes 61 at a pressure in excess of the pressure of both the cooling fluid and the hostile gaseous atmosphere, e.g., 90 lbs/in.$^2$, thus setting up a gaseous curtain which prevents communication therebetween. A gaseous sealing medium is selected which is compatible with both the chamber atmosphere and the interior of the engaging device 38, e.g. nitrogen gas. As shown in FIG. 6, conventional sealing rings 62 may be secured to the wall 53 by a retainer 63 to serve as a secondary sealing system.

With continued reference to FIG. 6, the engaging member 46 may be rotatably driven by a sprocket and chain assembly 64 secured to the interior end of hollow shaft 50 within elongated arm 42. A source of driving force 65, e.g., an electric motor, may be conveniently mounted on the support facility 40 to drive the sprocket and chain assembly 64. Alternatively, a reciprocating arm linkage may be disposed within the elongated arm 42 to drive the engaging member 46.

The present invention is not intended to be limited by the description of the preferred embodiment disclosed herein. Rather, it is defined by the claims which follow.

We claim:

1. A method of attenuating a ribbon of glass which moves downstream through a chamber upon a pool of molten metal, comprising the steps of:
    providing a cylindrical member having ribbon engaging means mounted in a manner to provide tractive forces about the circumferential surface of said cylindrical member;
    supporting said cylindrical member with its lower circumferential surface adjacent and substantially parallel to the surface of said ribbon; and
    rotating said cylindrical member about an axis of rotation generally parallel to the direction of ribbon flow to engage said ribbon with said ribbon engaging means to exert laterally outward tractive forces to the ribbon which are substantially uniform along the engaged portion thereof.

2. The method as set forth in claim 1 wherein said providing step further comprises:
    mounting said ribbon engaging element along at least one longitudinally elongated helical path about the circumferential surface of said cylindrical member.

3. The method as set forth in claim 2 wherein the ribbon has a downstream velocity and said rotating step comprises:
    rotating said cylindrical member about said axis of rotation at an angular velocity such that the product of the pitch of said helical path and said angular velocity represents a velocity which is substantially equal to said downstream velocity of said ribbon adjacent said cylindrical member.

4. The method as set forth in claim 3 wherein said ribbon engaging element comprises a plurality of teeth, and wherein said mounting step comprises:
    providing a distance between adjacent ones of said plurality of teeth along said helical path such that an element of said ribbon is engaged by an upstream tooth at a predetermined point in the engagement path of said upstream tooth, then released from engagement with said upstream tooth to move downstream, and subsequently engaged by the adjacent downstream tooth along said helical path at substantially the same predetermined point in the engagement path of said downstream tooth.

5. The method as set forth in claim 3 further comprising the step of:
    adjusting the axis of rotation of said cylindrical member with respect to the direction of ribbon flow to alter the laterally outward tractive forces exerted by said ribbon engaging element.

6. An apparatus for attenuating a ribbon of glass which moves downstream through a chamber upon a pool of molten metal comprising:
    a generally cylindrical member;
    a ribbon engaging element disposed on the circumferential surface of said cylindrical member;
    a pair of spaced support members, each having a first end portion;
    means for connecting said cylindrical member to and between said first end portions with its lower circumferential surface adjacent and substantially parallel to the surface of said ribbon; and
    means for rotating said cylindrical member about an axis generally parallel to the direction of ribbon flow to engage the ribbon with said ribbon engaging element and exert laterally outward tractive forces thereto.

7. The apparatus as set forth in claim 6 further comprising:
    means for passing cooling fluid through at least one of said support members into said cylindrical member; and
    means within said cylindrical member for localizing said cooling fluid passage adjacent the inner surface of said cylindrical member.

8. The apparatus as set forth in claim 6 or 7 further comprising:
    means for establishing a gaseous curtain adjacent the interface of the at least one support member and the cylindrical member to prevent the escape of cooling fluid therebetween, said establishing means capable of maintaining gaseous pressure in excess of the pressure of said cooling fluid.

9. The apparatus as set forth in claim 8 wherein said teeth have a circumferential dimension and a longitudinal dimension with respect to said cylindrical member and wherein the aspect ratio of said circumferential dimension to said longitudinal dimension is equal to or less than one.

10. The apparatus as set forth in claim 6 wherein said ribbon engaging element comprises a plurality of discrete teeth and further comprising:

means for mounting said teeth to the circumferential surface of said cylindrical member such that said teeth may be removed and replaced.

11. The apparatus as set forth in claim 10 wherein said mounting means includes detachable strap means secured in at least one longitudinally elongated helical path on said circumferential surface.

12. The apparatus as set forth in claim 11 wherein said mounting means comprises a plurality of strap means spaced from one another equidistantly about the circumferential surface of said cylindrical member a distance generally equal to the length of the engagement path of said teeth.

13. The apparatus as set forth in claim 6 wherein said rotating means comprises:

a chain and sprocket system disposed within one of said elongated arms; and means for rotatably driving said chain and sprocket system from without said chamber.

14. In a method of making a continuous ribbon of glass having less than equilibrium thickness, comprising the steps of delivering a stream of molten glass onto a pool of molten metal contained in a forming chamber to form a ribbon of glass; attenuating the ribbon of glass to a less than equilibrium thickness by the application of tractive forces in an attenuation region of the chamber where the temperature is in excess of about 1500° F. (815° C.) and the ribbon has a relatively low viscosity and is attenuatable with relatively small tractive forces; and advancing the ribbon downstream from the attenuation region into a passive region of the chamber where the ribbon is cooled toward a discharge temperature of a temperature less than about 1500° F. (815° C.), wherein the ribbon as it cools has increasing viscosity and is attenuatable only by relatively large tractive forces of a degree not exertable in a conventional localized area of application, wherefore the ribbon remains laterally unrestrained in said passive region resulting in longitudinally oriented distortion patterns therein, the improvement comprising the steps of:

engaging an elongated substantial continuum of opposed marginal edge portions of the ribbon as it advances through the passive region, wherein said elongated substantial continuum defines an engaged area of said marginal edge portion having a dimension in the direction of ribbon advance which is at least about twice its dimension transverse to the direction of the ribbon advance, wherein said engaging step is practiced with a biasing force sufficient to provide a secure engagement to positively exert laterally outward tractive forces to diminish said longitudinally oriented distortion patterns; while maintaining said engaged elongated substantial continuums of said opposed marginal edge portions at a temperature less than or equal to the temperature of marginal edge portions immediately upstream therefrom.

15. The method as set forth in claim 14 wherein said force exerting step is practiced when the ribbon is in the temperature range between 1500° F. (815° C.) and 1100° F. (595° C.), and further comprising the step of:

withdrawing the ribbon of less than equilibrium thickness from said molten metal pool.

16. The method as set forth in claim 15 wherein said force exerting step is practiced when the temperature of the ribbon is between about 1500° F. (815° C.) and about 1250° F. (678° C.).

17. The method as set forth in claim 14 or 16 wherein said force exerting step is practiced such that said laterally outward tractive forces are applied along elongated longitudinal portions of the marginal edge of the ribbon in such manner that the longitudinal movement of the ribbon is not substantially impeded.

18. The method as set forth in claim 17 wherein said attenuating step includes:

exerting longitudinal forces to the ribbon adjacent the downstream end of the second region of the molten metal pool.

19. The method as set forth in claim 18 wherein said attenuating step further includes:

exerting lateral stretching forces to the marginal edge portions of the ribbon in the first region of the molten metal pool.

20. A glass ribbon engaging device comprising:

a head member;

a plurality of ribbon engaging elements spaced about said head member; and means for mounting said plurality of ribbon engaging elements to the surface of said head member such that said plurality of ribbon engaging elements may be conveniently removed and replaced, wherein said mounting means comprises a detachable strap means engaging a plurality of said ribbon engaging elements in a manner to secure said plurality of ribbon engaging elements to the surface of said head member.

21. The device as set forth in claim 20 wherein said head member is a generally cylindrical member, and wherein said detachable strap means is disposed in at least one longitudinally elongated helical path about the circumferential surface of said cylindrical member.

22. The device as set forth in claim 21 wherein said cylindrical member has a shaped groove in its circumferential surface; wherein said strap means is disposed within said shaped grooves, and further comprising:

means for securing said strap means within said shaped groove.

23. The device as set forth in claim 20 or 21 further comprising:

means for rotating said head member about an axis of rotation.

* * * * *